Figure 1:
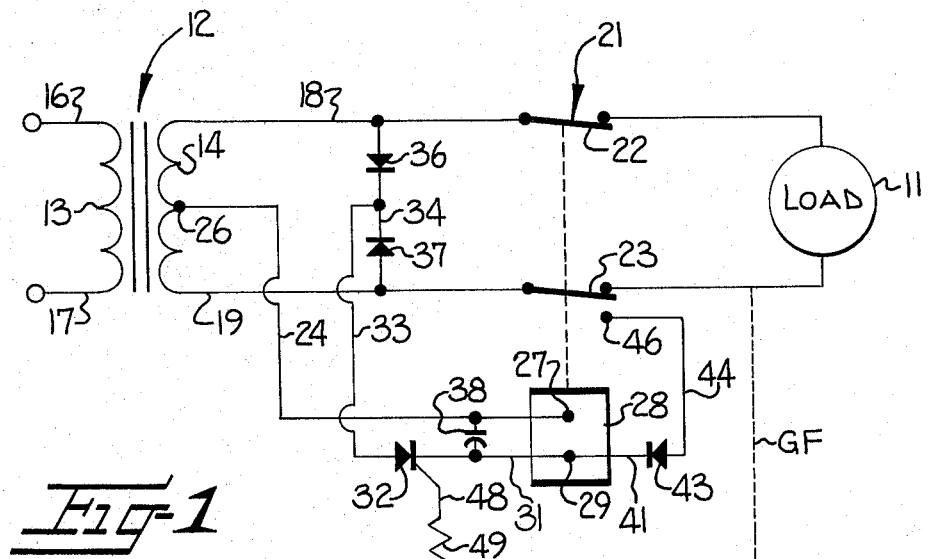

March 22, 1966  C. J. ROGERS, SR  3,242,382

ELECTRICAL SAFETY CIRCUIT

Filed June 25, 1965

INVENTOR:
CHARLES J. ROGERS, SR.

BY *T. Russell Foster*

ATTORNEY

United States Patent Office 3,242,382
Patented Mar. 22, 1966

3,242,382
ELECTRICAL SAFETY CIRCUIT
Charles J. Rogers, Sr., 1312 Coosaw Drive,
Charleston, S.C.
Filed June 25, 1965, Ser. No. 467,055
10 Claims. (Cl. 317—18)

This invention relates to an electrical safety circuit and more particularly to an improved electrical safety circuit for preventing personal injury and property damage in an electrical distribution system. This application is a continuation-in-part of the co-pending application entitled Electrical Safety Circuit, Serial No. 264,301, filed by C. J. Rogers, Sr., on March 11, 1963.

In electrical power distribution systems, particularly a distribution system of the type found in residential construction which provides a "hot" conductor and an associated ground wire for supplying power to a load, many hazards arise upon the presence of a defect in or inadvertent contact by a person with the hot or live conductor. For instance, the contact by a person with a live conductor in such a system can frequently produce a severe electrical shock and on occasion a fatality due to the circuit completed through the human body and the ground conductor in the system. Another type of fault common to such a system is a direct short to ground from the live conductor for which protection is generally provided in the form of overload devices and/or a low resistance ground to localize the fault. However, overload devices generally do not operate except upon a high current flow common to an overload so that current leakage can occur resulting in a fire hazard and waste of current. Furthermore, low resistance protective grounds are often improperly connected and many times are not used so that such fault protections do not provide the desired degree of protection sought.

It has been proposed to couple such an electrical distribution system to the power source by means of an isolation transformer or the like with the attendant elimination of the conventional ground wire so as to isolate the live or line conductor from ground. Such a circuit also includes a special grounded circuit connected to a circuit breaker arranged to interrupt the line conductors upon the presence of a low resistance ground fault in a line conductor or the contact by a person with a line conductor in which the person's body is utilized together with the special grounded circuit for producing such circuit interruption.

As has been described in the aforementioned co-pending patent application, the completion of a circuit through the human body for actuating the circuit breaker is latent with hazards as the circuit breaker may for some reason fail to operate or operate too slowly to prevent bodily injury. Furthermore, the magnitude of the voltage in such circuits when a circuit is completed through the human body is generally higher than the voltage magnitude suggested by safety organizations which should not be exceeded for positive protection against injury to the human body. In the aforementioned co-pending patent application, an electrical safety circuit has been described and claimed which utilizes such an isolation transformer but which eliminates the use of a circuit completed through the human body for actuating a protective device upon inadvertent contact with a line conductor by an individual. The invention in the aforementioned co-pending application obtains this novel result by utilizing a voltage level which is below the level recommended for positive human safety and eliminates any circuit completion through the human body for protective purposes. However, while the hazards incident to the use of a relatively high voltage have been eliminated with the invention of the aforementioned co-pending application, safety is not absolutely assured according to standards established by such safety organizations which have established a current magnitude which also must not be exceeded for positive protection against injury to the human body.

Accordingly, a primary object of this invention is to provide a new and novel improved safety circuit for an electrical distribution system of the type commonly found in residences, shops, buildings and the like which positively prevents property damage and bodily injury.

Another object of this invention is to provide a new and novel improved electrical safety circuit for an electrical distribution system which completely eliminates any hazard to property or persons from both the current and voltage employed in the system.

A further object of this invention is to provide a new and novel improved safety circuit for an electrical distribution system which utilizes current and voltage values below those values established by safety organizations as proper for positive protection against injury to the human body.

Still another object of this invention is to provide a new and novel improved electrical safety circuit for an electrical distribution system which is non-responsive to the grounding of a line conductor by the human body so as to positively eliminate bodily injury or death but which responds quickly to a low resistance ground fault on the line conductor at current and voltage magnitudes which are below those established by safety organizations for positive human safety.

This invention further contemplates the provision of a new and novel safety circuit for an electrical distribution system which is simple and inexpensive in construction, which utilizes reliable and rugged circuit components which are readily available, which may be readily compacted or miniaturized for a variety of uses and which operates quickly in a foolproof manner only upon the presence of the low resistance ground fault on a line conductor while insuring positive human protection from injury or death.

Other objects and advantages of the invention will become apparent from the following description taken in connection with the accompanying drawing.

In general, the objects of the invention and related objects are accomplished by providing a transformer having a primary winding arranged to be connected to a source of electrical power. The secondary winding of the transformer is arranged to be connected by means of line conductors to a load and normally closed switching means are provided for interrupting the line conductors and disconnecting the load from the transformer secondary winding. Normally inoperative first circuit means are also connected to the transformer secondary winding for actuating the switching means at a predetermined amperage. Second circuit means is connected between the first circuit means and ground for operatively conditioning the first circuit means and the second circuit means is normally non-responsive to a fault produced by the grounding of a line conductor by the human body. The second circuit means is arranged to conduct upon the presence of a low resistance ground fault on a line conductor to operatively condition the first circuit means at an amperage which is substantially below the predetermined amperage of the first circuit means and which is limited to a magnitude considered positively non-injurious to the human body whereby the first circuit means responds to actuate the switching means and interrupt the line conductors to disconnect the load from the source of power.

Figure 2:
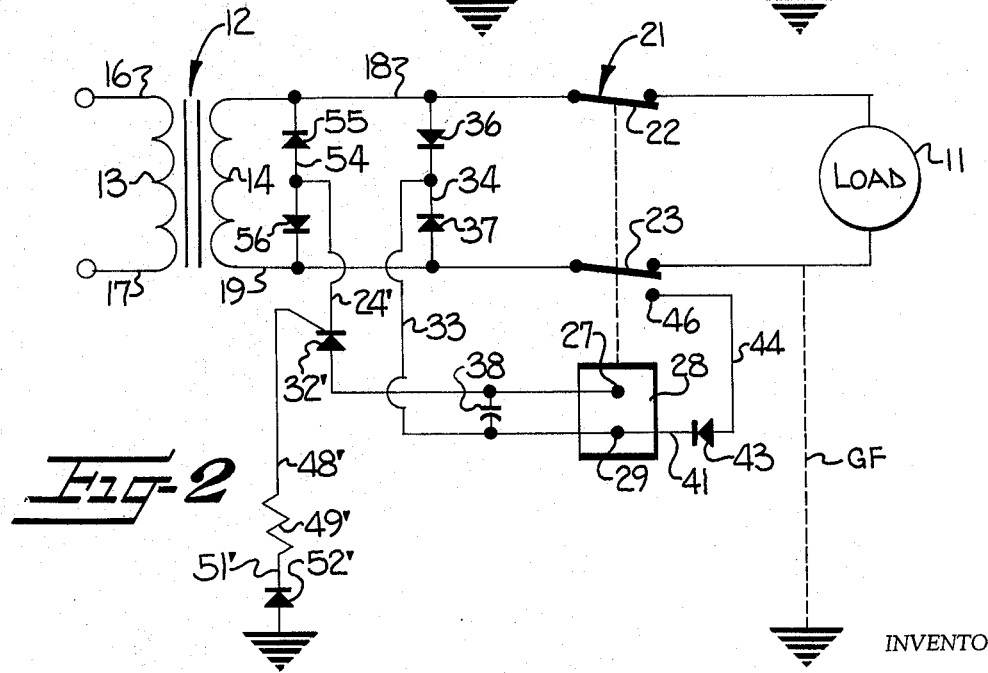

The novel features which are believed to be characteristic of the invention are set forth with particularity in the appended claims. The invention itself, however, both as to its organization and method of operation may be best understood by reference to the following description taken in conjunction with the accompanying drawing in which:

FIGURE 1 is a schematic wiring diagram illustrating the improved electrical safety circuit of the invention; and FIGURE 2 is a modification of the electrical safety circuit of FIGURE 1.

Referring now to the drawing, there is shown a safety circuit constructed in accordance with the invention for protection of an electrical distribution system against damage and current leakage as a result of a ground fault and to prevent injuries to persons coming into contact with the "hot" wires or line conductors in the system. The safety circuit of the invention is an improvement on the electrical safety circuit of the aforementioned copending patent application filed by the same applicant. The electrical safety circuit of the invention is arranged to supply a load 11 such as lighting, appliances or a motor with electrical power from a suitable source (not shown).

In order to connect the load 11 to the source of power, an isolation transformer designated generally by the numeral 12 is provided in the circuit of the invention and the transformer 12 contains a primary winding 13 and a secondary winding 14. The primary winding 13 of the transformer 12 is connected at its ends by means of conductors 16, 17 to a source of power (not shown). The transformer 12 is of the type which provides a 1:1 ratio so as to provide the same voltage across the transformer secondary winding 14 as the voltage across the transformer primary winding 13. As the circuit of the invention is particularly adaptable for use in residences, shops, buildings, etc., where the source of power is at a voltage of approximately 120 volts A.C., the voltage across both transformer windings 13, 14 in such an installation is approximately 120 volts A.C. As is well known, the use of the isolation transformer 12 permits the conventional ground wire commonly employed with the secondary winding 14 to be eliminated and the secondary winding 14 is therefore isolated from ground.

The ends of the transformer secondary winding 14 are connected by means of "hot" or line conductors 18, 19 to the motor or load 11 through normally closed switching means designated generally by the numeral 21. Switching means 21 includes a pair of gang operated switches 22, 23 which are normally urged into the closed position as shown in the drawing to connect the transformer secondary winding 14 to the load 11.

Normally inoperative first circuit means are provided in the circuit of the invention for actuating the switching means 21 at a predetermined amperage thereby moving the switches 22, 23 to the open position to interrupt conductors 18, 19 and to disconnect the load 11 from the transformer secondary winding 14. More specifically, a conductor 24 is provided which is connected at one end to the center tap 26 of the transformer secondary winding 14 as shown in FIGURE 1. The other end of conductor 24 is connected to one terminal 27 of a relay coil 28 which is operatively associated with the switching means 21 in the conventional manner.

The relay coil 28 has its other terminal 29 connected by means of conductor 31 to one side of an electrical "valve" or "gate" 32 which is preferably a device such as a silicon controlled rectifier commonly referred to as an SCR. The silicon controlled rectifier 32 or SCR is a commercially available electrical device manufactured by the General Electric Company which normally is non-conductive but when it is activated by a relatively low current it becomes conductive. In the novel circuit of the invention, the current magnitude at which rectifier 32 becomes conductive is an amperage substantially less than the predetermined amperage in the first circuit means required to energize the relay 28 and actuate the switching means 21. More specifically, the amperage at which the rectifier 32 becomes conductive is limited to a magnitude considered positively non-injurious to the human body.

The other side of the rectifier 32 is connected by means of conductor 33 to conductor 34 connected at each end to half-wave rectifiers or diodes 36, 37 the other ends of which are connected to line conductors 18, 19 respectively. In accordance with well known electrical principles which are referred to in the aforementioned co-pending patent application, the rectifier 32 provides a voltage in the first circuit means including the relay coil 28 of a magnitude of approximately ½ of the voltage obtained at the transformer secondary winding center tap 26. As is well known, if the voltage applied to the primary winding 13 of the transformer 12 across conductors 16, 17 is approximately 120 volts A.C., the voltage obtained at the transformer secondary winding voltage center tap 26 is approximately 60 volts being one-half of the voltage across the secondary winding 14. With the use of the silicon controlled rectifier 32, the D.C. voltage impressed on the relay coil 28 is a voltage of approximately 27 volts D.C. which is approximately ½ of the transformer secondary winding center tap voltage of 60 volts. Preferably, capacitor 38 is connected between conductors 24, 31 as shown for smoothing out the ripple in the 27 volts D.C. voltage provided in the first circuit means and applied to relay coil 28.

Circuit means are also provided in the circuit of the invention for retaining the switching means 21 in the open position in which the load 11 is disconnected from the line conductors 18, 19. More specifically, the relay terminal 29 is connected by means of conductor 41 to one side of a half-wave rectifier or diode 43 the other side of which is connected by means of conductor 44 to a terminal or contact 46 positioned adjacent the switch 23 as shown.

Second circuit means are provided in the circuit of the invention which are normally non-responsive to a fault produced by the grounding of one of the line conductors 18, 19 by the human body. This second circuit means is arranged to conduct upon the presence of a low resistance ground fault on one of the line conductors and operatively condition the normally inoperative first circuit means at an amperage which is substantially below the predetermined amperage of the first circuit means and which is limited to a magnitude considered positively non-injurious to the human body whereby the first circuit means responds to actuate the switching means and interrupt the line conductors 18, 19 to disconnect the load from the source of power.

More specifically, in such second circuit means the silicon controlled rectifier 32 is connected by means of a conductor 48 to one side of a resistor 49. The other side of the resistor 49 is connected by means of conductor 51 to one side of a half-wave rectifier or diode 52 the other side of which is grounded as shown. The resistor 49 has a high resistance, preferably about 5600 ohms, so as to substantially increase the resistance in the grounded circuit produced by a human body contacting one of the line conductors 18, 19 and to limit the maximum possible current flow to 48 milliamperes in a ground fault circuit which includes conductor 48. However, its resistance is not so high as to interfere with the flow of current resulting from a low resistance ground fault on the conductors 18, 19.

The diode 52 produces a voltage of approximately 27 volts D.C. in its circuit in the manner previously described with reference to the normally inoperative first circuit means which includes the silicon controlled rectifier 32 and as described in the aforementioned co-pending patent application is substantially below that voltage level of 30 volts considered by various safety organizations as positively non-injurous to the human body. The current magnitude in the second circuit means, which includes the resistor 49, required to operatively condition the silicon controlled rectifier 32 is substantially below the predetermined amperage in the first circuit means including the rectifier 32 which is required to energize the relay coil 28. In practice, it has been found that an amperage of approximately 2⅓ milliamperes is sufficient to cause the rectifier 32 to conduct and thus amperage is substantially below the 5 milliamperes established by various safety organizations as positively non-injurious to the human body.

In the operation of the circuit of the invention, the primary winding 13 of the isolation transformer 12 is connected to a suitable source of power by means of conductors 16, 17 and the load 11 is connected by means of line conductors 18, 19 to the transformer secondary winding 14. The switches 22, 23 are in the normally closed position of FIGURE 1 so that power is supplied to the load 11.

Upon the presence of a low resistance ground fault in one of the line conductors 18, 19 such as results upon the contact of a bare portion of one of the line conductors with ground or a short in the windings of a motor or the like which comprises the load 11, assuming the frame is in electrical contact with the ground, a grounded circuit is immediately established. In FIGURE 1, such a low resistance ground fault on conductor 19 has been indicated by the refence characters GF.

As a result of the ground fault GF, a circuit is completed from line conductor 19 through ground to the grounded diode 52, conductor 51, resistor 49, conductor 48, silicon controlled rectifier 32, relay coil 28, conductor 24 to center tap 26 of the transformer secondary winding 14 and through one half of the transformer secondary winding to conductor 19. As discussed in the aforementioned patent application, the diode 52 produces a voltage of approximately 27 volt D.C. in this grounded circuit. As has been previously explained, the silicon controlled rectifier 32 which is normally non-conductive, is designed to respond to approximately a 2⅓ milliampere current flow in the second circuit means now included in the fault circuit. Thus, as soon as the current reaches a magnitude of 2⅓ milliamperes, rectifier 32 conducts to complete a circuit and current flows in conductor 33 at the predetermined amperage, which is preferably approximately 80 milliamperes. This completed circuit includes rectifier 32, relay coil 28, conductor 24 to the secondary transformer winding center tap 26 through one half of the secondary winding 14 to line conductor 19, diode 37, conductor 34 and back to rectifier 32 through conductor 33.

Upon the flow of this large current in the relay coil 28, the relay is energized and the switching means 21 is actuated to move the switches 22, 23 to the open position interrupting the line conductors 18, 19, disconnecting the load 11 from the source of power and clearing the ground fault GF. Upon clearing the ground fault GF, the grounded circuit is interrupted and current flow through the second circuit means including diode 52 is terminated so that rectifier 32 again becomes non-conductive opening the circuit of which it is a part. However, as switch 23 has now made contact with the holding contact 46, a holding circuit is completed through line conductor 19, switch 23 and contact 46, conductor 44, diode 43, relay coil 28, conductor 24 to center tap 26 and through one half of the transformer secondary winding 14 back to conductor 19 so that a current flow of approximately 80 milliamperes at a voltage of approximately 27 volts D.C. produced by the diode 43 continued to flow through the relay coil 28 maintaining it in the energized condition. The switching means 21 is therefore held in the open position to permit the ground fault to be removed and will remain open until reset by suitable resetting means (not shown).

With the use of diode 43, the voltage in the holding circuit is maintained at the non-injurious level of approximately 27 volts D.C. In the same manner as described and claimed in the aforementioned co-pending patent application, the silicon controlled rectifier 32 also produces a non-injurious voltage of approximately 27 volts D.C. in the first circuit means.

If the ground fault GF occurs on line conductor 18, the same circuit operation results except that the current flow in the circuit including the rectifier 32 occurs through rectifier or diode 36 and the other half of the transformer secondary winding 14.

If one of the line conductors 18, 19 is contacted by the body of a person or if a person touches the frame of the motor 11 which is ungrounded but wherein the motor winding has become shorted to the frame, a grounded circuit similar to the GF grounded circuit is completed. However, in this circuit, there is virtually no flow of current through this person's body due to the high body resistance, the high resistance of resistor 49 and the low voltage of approximately 27 volts D.C. in the circuit which includes the rectifier 52. As has been explained, 27 volts D.C. is below the voltage level established by various safety organizations as positively non-injurious to the human body. In addition, the maximum possible amperage which can flow through the human body in this grounded circuit is limited to approximately 2⅓ milliamperes far below the current magnitude established by various safety organizations as positively non-injurious to the human body since the silicon controlled rectified 32 "fires" or conducts when 2⅓ milliamperes is reached putting into action the circuit operation by means of which the body grounded circuit is interrupted. Thus, in the usual case, the establishment of a ground by a person's body in the circuit of the invention does not produce an actuation of a switching means 21 and switches 22, 23 remain in the closed position. As a result of the low voltage and maximum permitted current in such a body grounded circuit, injury or death from the electrical shock to a person is positively prevented under all conditions.

FIGURE 2 illustrates a slightly modified circuit constructed in accordance with the invention wherein like numerals are used to identify like parts. In the circuit of FIGURE 2, the silicon controlled rectifier which is identified by the numeral 32' is positioned in conductor 24' rather than being connected between conductors 31, 33 as in FIGURE 1. This change in the position of rectifier 32' from that of FIGURE 1 does not alter the operation of the invention in that the rectifier 32' is in the same first circuit means and has connected thereto in the identical manner conductor 48', resistor 49', conductor 51', and diode 52' connected in turn to ground.

In the embodiment of FIGURE 2, the conductor 24' is not connected to the center tap 26 of the transformer secondary winding 14 as in FIGURE 1 but, instead, conductor 24' is connected to conductor 54, connected at each end to rectifiers or diodes 55, 56 connected in turn to line conductors 18, 19. Therefore, the voltage rectified in the first circuit means which includes the silicon controlled rectifier 32' is the voltage applied across the transformer secondary winding 14. Thus when the voltage applied across the secondary winding 14 is 120 volts A.C., the rectified voltage produced in the first circuit means and applied to the relay coil 28 is approximately 54 volts D.C. Such a modified circuit may be used where the low voltage of the invention may not be required in the first circuit means incorporating the rectifier 32'.

It can be seen that there has been provided with the novel improved electrical safety circuit of the invention an arrangement whereby low resistance ground faults on load lines are quickly and positively cleared so as to eliminate the likelihood of damage to both the circuit and to the area in which the circuit is installed. The circuit of the invention eliminates the ground wire on the load side of the isolation transformer connected to the power source and both the voltage and the current in the grounded fault circuit by means of which the circuit is actuated are limited to a magnitude which is positively non-injurious to the human body. Thus, if the line conductors in the circuit of the invention are inadvertently contacted by a person, the low voltage and available current in the body grounded circuit are such that no actuation of the circuit results and no risk of injury of fatality to the person is present. The maximum permissible current flow in the grounded circuit is approximately 2⅓ milliamperes substantially below the level of 5 milliamperes established as positively safe by certain organizations and the voltage in the same circuit is similarly below the established safety level giving an absolutely safe and foolproof circuit. The circuit of the invention utilizes readily available inexpensive components and it is an extremely simple arrangement so that is can be easily compacted or miniaturized for use in residential areas, industrial areas or the like and incorporated in portable tools where such a circuit is particularly desirable. The incorporation in the circuit of the invention of a silicon controlled rectifier not only aids in the provision of positive protection but positively insures that the circuit will operate when the necessary conditions are present.

While there has been described what at present is considered to be the preferred embodiment of the invention, it will be understood by those skilled in the art that various changes and modifications may be made therein without departing from the invention and, therefore, it is the aim of the appended claims to cover all such changes and modifications as fall within the true spirit and scope of the invention.

Having thus described the invention, what is claimed is:

1. An improved electrical safety circuit comprising, in combination, a transformer having a primary winding arranged to be connected to a source of electrical power and a secondary winding arranged to be connected by means of line conductors to a load, normally closed switching means for disconnecting said load from said source of power, normally inoperative first circuit means connected to said transformer secondary winding for actuating said switching means at a predetermined amperage, second circuit means connected between said first circuit means and ground for operatively conditioning said first circuit means, said second circuit means being normally non-responsive to a fault produced by the grounding of one of said line conductors by the human body, said second circuit means being arranged to respond to the presence of a low resistance ground fault on one of said line conductors to operatively condition said first circuit means at an amperage which is substantially below said predetermined amperage in said first circuit means and positively non-injurious to the human body whereby said operatively conditioned first circuit means actuates said switching means to disconnect said load from said source of power.

2. An improved electrical safety circuit comprising, in combination, a transformer having a primary winding arranged to be connected to a source of electrical power and a secondary winding arranged to be connected by means of line conductors to a load, normally closed switching means for disconnecting said load from said source of power, normally inoperative first circuit means connected to said transformer secondary winding for actuating said switching means at a predetermined amperage, second circuit means connected between said first circuit means and ground for operatively conditioning said first circuit means, said second circuit means including means for limiting the voltage in said second circuit means to a magnitude which is positively non-injurious to the human body and at which said second circuit means is non-responsive to a fault produced by the grounding of one of said line conductors by the human body, means for limiting the current flow in said second circuit means to a magnitude which is positively non-injurious to the human body, said second circuit means being arranged to respond upon the presence of a low resistance ground fault on one of said line conductors to operatively condition said first circuit means, whereby said operatively conditioned first circuit means actuates said switching means to disconnect said load from said source of power.

3. An improved electrical safety circuit in accordance with claim 2 including means for limiting the voltage in said first circuit means to a magnitude positively non-injurious to the human body.

4. An improved electrical safety circuit comprising, in combination, a transformer having a primary winding arranged to be connected to a source of electrical power and a secondary winding arranged to be connected by means of line conductors to a load, normally closed switching means for disconnecting said load from said source of power, first circuit means including a normally open electrical valve connected to said transformer secondary winding for actuating said switching means at a predetermined amperage, said normally open electrical valve being arranged to maintain said first circuit means normally inoperative, said electrical valve being arranged to close in response to a current which is positively non-injurious to the human body and operatively condition said first circuit means, second circuit means connected between said electrical valve and ground for applying current to said electrical valve, said second circuit means including means for limiting the voltage in said second circuit means to a magnitude which is positively non-injurious to the human body and at which said second circuit means is non-responsive to a fault produced by the grounding of one of said line conductors by the human body, said second circuit means being arranged to conduct upon the presence of a low resistance ground fault on one of said line conductors and apply said non-injurious current to said electrical valve whereby said electrical valve closes and operatively conditions said first circuit means to actuate said switching means and disconnect said load from said source of power.

5. An improved electrical safety circuit in accordance with claim 4 wherein said electrical valve is a silicon controlled rectifier.

6. An improved electrical safety circuit comprising, in combination, a transformer having a primary winding arranged to be connected to a source of electrical power and a secondary winding arranged to be connected by means of line conductors to a load, normally closed switching means for disconnecting said load from said source of power, first circuit means including a silicon controlled rectifier having a gate connected to the center tap of said transformer secondary winding for actuating said switching means at a predetermined amperage, said silicon controlled rectifier being arranged to maintain said first circuit means normally inoperative, said silicon controlled rectifier being arranged to close in response to a current which is positively non-injurious to the human body and operatively condition said first circuit means, second circuit means including a half-wave rectifier connected between the gate of said silicon controlled rectifier and ground for applying current to said silicon controlled rectifier, said half-wave rectifier being arranged to limit the voltage in said second circuit means to a magnitude which is positively non-injurious to the human body and at which said second circuit means is non-responsive to a fault produced by the grounding of one of said line conductors by the human body, said second circuit means being arranged to conduct upon the presence of a low resistance ground fault on one of said line conductors and apply said non-injurious current to the gate of said silicon controlled rectifier whereby said silicon controlled rectifier closes and operatively conditions said first circuit means to actuate said switching means and disconnect said load from said source of power.

7. An improved electrical safety circuit in accordance with claim 6 including a holding circuit for maintaining said switching means in the actuated position with said load disconnected from said source of power.

8. An improved electrical safety circuit comprising, in combination, a transformer having a primary winding arranged to be connected to a source of electrical power and a secondary winding arranged to be connected by means of line conductors to a load, normally closed switching means for disconnecting said load from said source of power, a relay coil connected to the center tap of said transformer secondary winding for actuating said switching means at a predetermined amperage, a silicon controlled rectifier having a gate connected at one side to said relay coil, a pair of reversely positioned rectifiers having corresponding sides connected to the other side of said silicon controlled rectifier and each connected at their other side to one of said line conductors, said silicon controlled rectifier being arranged to maintain said relay coil normally inoperative and being arranged to close in response to a current which is positively non-injurious to the human body to operatively condition said relay coil, a grounded circuit including a resistor and a rectifier connected between the gate of said silicon controlled rectifier and ground, a holding circuit including a half-wave rectifier connected between said switching means and said relay coil, said half-wave rectifiers in said holding circuit and said grounded circuit and said silicon controlled rectifier being arranged to limit the voltage to a magnitude which is positively non-injurious to the human body and at which said grounded circuit is non-responsive to a fault produced by the grounding of one of said line conductors by the human body, said grounded circuit being arranged to conduct upon the presence of a low resistance ground fault on one of said line conductors and apply said non-injurious current to the gate of said silicon controlled rectifier whereby said silicon controlled rectifier closes and operatively conditions said relay coil to actuate said switching means and disconnect said load from said source of power.

9. An improved electrical safety circuit comprising, in combination, a transformer having a primary winding arranged to be connected to a source of electrical power and a secondary winding arranged to be connected by means of line conductors to a load, normally closed switching means for disconnecting said load from said source of power, normally inoperative first circuit means connected to said transformer secondary winding for actuating said switching means at a predetermined amperage, second circuit means connected between said first circuit means and ground for operatively conditioning first circuit means, said second circuit means including means for limiting the voltage in said second circuit means to approximately one half of the voltage across said transformer secondary winding and at which said second circuit means is non-responsive to a fault produced by the grounding of one of said line conductors by the human body, said second circuit means being arranged to respond to the presence of a low resistance ground fault on one of said line conductors to operatively condition said first circuit means at an amperage which is substantially below said predetermined amperage in said first circuit means and positively non-injurious to the human body whereby said operatively conditioned first circuit means actuates said switching means to disconnect said load from said source of power.

10. An improved electrical safety circuit comprising, in combination, a transformer having a primary winding arranged to be connected to a source of electrical power and a secondary winding arranged to be connected by means of line conductors to a load, normally closed switching means for disconnecting said load from said source of power, a relay coil for actuating said switching means at a predetermined amperage, a first pair of reversely positioned rectifiers having corresponding sides connected to one side of said relay coil and each connected at their other side to one of said line conductors, a second pair of rectifiers reversely positioned oppositely from the position of said first pair of rectifiers having corresponding sides connected to the other side of said relay coil and each connected at their other sides to one of said line conductors, a silicon controlled rectifier having a gate serially connected with said relay coil between said first and second pairs of rectifiers, said silicon controlled rectifier being arranged to maintain said relay coil normally inoperative and being arranged to close in response to a current which is positively non-injurious to the human body to operatively condition said relay coil, a grounded circuit including a resistor and a rectifier connected between the gate of said silicon controlled rectifier and ground, a holding circuit including a half-wave rectifier connected between said switching means and said relay coil, said half-wave rectifiers in said holding circuit and said grounded circuit being arranged to limit the voltage to approximately one-half of the voltage across said transformer secondary winding and at which said grounded circuit is non-responsive to a fault produced by the grounding of one of said line conductors by the human body, said grounded circuit being arranged to conduct upon the presence of a low resistance ground fault on one of said line conductors to apply said non-injurious current to the gate of said silicon controlled rectifier whereby said silicon controlled rectifier closes and operatively conditions said relay coil to actuate said switching means and disconnect said load from said source of power.

References Cited by the Examiner

UNITED STATES PATENTS

| | | | |
|---|---|---|---|
| 2,079,636 | 5/1937 | Sharp | 317—18 |
| 2,844,765 | 7/1958 | Sosnoski. | |
| 3,187,225 | 6/1965 | Mayer. | |

SAMUEL BERNSTEIN, *Primary Examiner.*

R. V. LUPO, *Assistant Examiner.*